(12) United States Patent
Byun

(10) Patent No.: US 9,488,858 B2
(45) Date of Patent: Nov. 8, 2016

(54) DISPLAY DEVICE

(71) Applicant: Samsung Display Co., Ltd., Yongin, Gyeonggi-Do (KR)

(72) Inventor: Ho Yun Byun, Osan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/812,277

(22) Filed: Jul. 29, 2015

(65) Prior Publication Data

US 2016/0291403 A1 Oct. 6, 2016

(30) Foreign Application Priority Data

Mar. 31, 2015 (KR) ........................ 10-2015-0045516

(51) Int. Cl.
*G02F 1/1335* (2006.01)
*G02F 1/1368* (2006.01)
*G02F 1/1333* (2006.01)

(52) U.S. Cl.
CPC ....... *G02F 1/133528* (2013.01); *G02F 1/1368* (2013.01); *G02F 1/133345* (2013.01); *G02F 1/133377* (2013.01); *G02F 1/133512* (2013.01); *G02F 1/133514* (2013.01)

(58) Field of Classification Search
CPC .................. G02F 1/133528; G02F 1/133345; G02F 1/133377
See application file for complete search history.

(56) References Cited

U.S. PATENT DOCUMENTS

2014/0132896 A1* 5/2014 Choi ................... G02F 1/13363
349/96
2015/0160509 A1* 6/2015 Lee ................... G02F 1/133528
349/42

FOREIGN PATENT DOCUMENTS

KR 10-2014-0058773 A 5/2014

* cited by examiner

*Primary Examiner* — Anne Hines
(74) *Attorney, Agent, or Firm* — Innovation Counsel LLP

(57) ABSTRACT

A display device for stably attaching a polarizer and preventing contamination of a liquid crystal layer includes: a substrate; a thin film transistor provided on the substrate; a pixel electrode connected to the thin film transistor; a roof layer disposed on the pixel electrode to be spaced apart from the pixel electrode with a plurality of microcavities therebetween; a liquid crystal layer for filling the microcavities; an adhesive member formed on the roof layer and sealing the microcavities; and a first polarizer provided on the adhesive member.

11 Claims, 9 Drawing Sheets

DISPLAY DEVICE

CROSS-REFERENCE TO RELATED APPLICATION

This application claims priority to and the benefit of Korean Patent Application No. 10-2015-0045516 filed in the Korean Intellectual Property Office on Mar. 31, 2015, the entire contents of which are incorporated herein by reference.

BACKGROUND (a) Technical Field

The present disclosure relates to a display device. More particularly, the present disclosure relates to a display device for stably attaching a polarizer for preventing contamination of a liquid crystal layer.

(b) Description of the Related Art

A liquid crystal display, which is presently a widely used type of flat panel display, includes two substrates with field generating electrodes, such as a pixel electrode and a common electrode, and a liquid crystal layer interposed therebetween. By applying voltages to the field generating electrodes to generate an electric field, the alignment of the liquid crystal molecules of the liquid crystal layer, and thereby the amount of light transmitted by the liquid crystal layer, may be controlled to display an image.

The two sheets of display panels configuring the liquid crystal display may include a thin film transistor array panel and an opposing display panel. A gate line transferring a gate signal and a data line transferring a data signal are formed to cross each other. A thin film transistor connected with the gate line and the data line, a pixel electrode connected with the thin film transistor, and the like may be formed on the thin film transistor array panel. A light blocking member, a color filter, a common electrode, and the like may be formed on the opposing display panel. In some cases, the light blocking member, the color filter, and the common electrode may be formed on the thin film transistor array panel.

However, because a liquid crystal display in the related art generally uses two sheets of substrates on which respective constituent elements are formed, the display device tends to be heavy and thick, has a high cost, and has a long processing time.

The above information disclosed in this Background section is only to enhance the understanding of the background of the present disclosure, and therefore it may contain information that does not form the prior art that is already known in this country to a person of ordinary skill in the art.

SUMMARY

The present disclosure provides a display device manufactured using one substrate, which has the advantages of reduced weight, thickness, cost, and processing time.

The present disclosure also provides a display device having the advantages of preventing: contamination of a liquid crystal layer when an additional overcoat is formed to seal the liquid crystal layer and a polarizer is attached to the overcoat, an increase in cost caused by an additional process, and peeling of a polarizer.

An exemplary embodiment of the present disclosure provides a display device including: a substrate; a thin film transistor provided on the substrate; a pixel electrode connected to the thin film transistor; a roof layer disposed on the pixel electrode to be spaced apart from the pixel electrode with a plurality of microcavities therebetween; a liquid crystal layer for filling the microcavities; an adhesive member formed on the roof layer and sealing the microcavities; and a first polarizer provided on the adhesive member.

The adhesive member may be provided directly on the roof layer.

The display device may further include an insulating layer provided on the roof layer, wherein the roof layer may be made of an organic material and the insulating layer may be made of an inorganic insulating material.

The adhesive member may be provided directly on the insulating layer.

The adhesive member may be made of a pressure-sensitive adhesive (PSA) or a photo-curing adhesive.

The display device may include a plurality of roof layers, the plurality of roof layers may extend in a first direction, and a first region may be provided among the roof layers.

The adhesive member may include a first adhesive member provided in the first region and blocking light; and a second adhesive member provided on the roof layer and having transparency.

The thin film transistor may be provided in the first region, and the first adhesive member may be provided on the thin film transistor.

A second region may be provided among the microcavities neighboring in the first direction.

The display device may further include a plurality of color filters provided below the pixel electrode, wherein the color filters may overlap each other in the second region.

The display device may further include a second polarizer provided below the substrate, wherein the adhesive member may be further provided between the substrate and the second polarizer.

The display device according to the exemplary embodiment of the present disclosure has the following effects.

According to the exemplary embodiment of the present disclosure, the display device and the manufacturing method thereof uses a single substrate, thereby reducing weight, thickness, cost, and processing time.

The overcoat is not formed on the roof layer, but the polarizer is attached thereto, thereby simplifying the process, reducing the cost, attaching the polarizer in a stable manner, and preventing the liquid crystal layer from being contaminated.

DETAILED DESCRIPTION OF THE EMBODIMENTS

Figure 1:
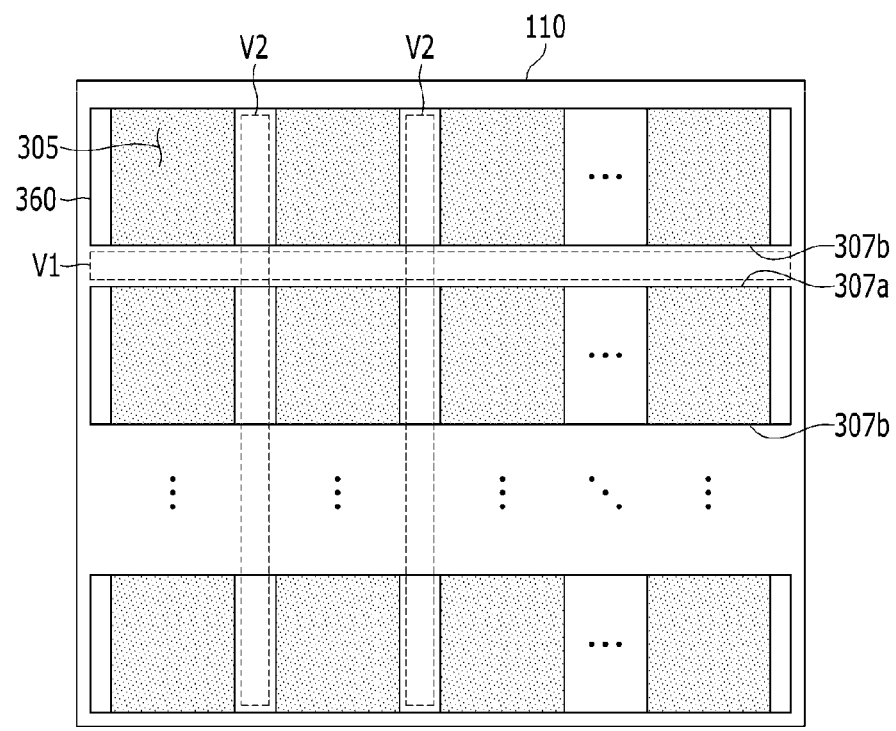
FIG. 1 shows a top plan view of a display device according to an exemplary embodiment of the present disclosure.

The present system and method are described more fully hereinafter with reference to the accompanying drawings in which exemplary embodiments of the present system and method are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element, such as a layer, film, region, or substrate, is referred to as being "on" another element, it can be directly on the other element, or intervening elements may also be present. In contrast, when an element is referred to as being "directly on" another element, there are no intervening elements present.

A display device according to an exemplary embodiment of the present disclosure is now described with reference to accompanying drawings.

FIG. 1 shows a top plan view of a display device according to an exemplary embodiment of the present disclosure.

The display device includes a substrate 110 made of a material such as glass or plastic.

A microcavity 305 covered by a roof layer 360 is formed on the substrate 110. The roof layer 360 extends in a row direction, and a plurality of microcavities 305 are formed below each roof layer 360.

The microcavities 305 may be disposed in a matrix format. A first region V1 is provided between the adjacent microcavities 305 provided in a column direction, and a second region V2 is provided between the adjacent microcavities 305 provided in a row direction.

The first region V1 is provided between adjacent ones of a plurality of roof layers 360. The microcavities 305 may not be covered by the roof layer 360 but may be exposed to the outside on portions contacting the first region V1, which are referred to as injection holes 307a and 307b.

The injection holes 307a and 307b are formed on respective edges of the microcavity 305. The injection holes 307a and 307b are configured with a first injection hole 307a and a second injection hole 307b. The first injection hole 307a is formed to expose a side of a first edge of the microcavity 305, and the second injection hole 307b is formed to expose a side of a second edge of the microcavity 305. The side of the first edge of the microcavity 305 faces the side of the second edge.

The roof layers 360 are respectively formed to be separate from the substrate 110 between adjacent second regions V2 to form the microcavity 305. That is, the roof layers 360 are formed to cover sides other than the sides of the first edge and the second edge on which the injection holes 307a and 307b are formed.

The configuration of the display device according to an exemplary embodiment of the present disclosure is an example, and various modifications are possible. For example, the dispositions of the microcavity 305, the first region V1, and the second region V2 are changeable; a plurality of roof layers 360 may be connected to each other in the first region V1; and part of the roof layers 360 may be formed to be separate from the substrate 110 in the second region V2 in order to connect adjacent microcavities 305.

A pixel of a display device according to an exemplary embodiment of the present disclosure is now described with reference to FIG. 2.

Figure 2:
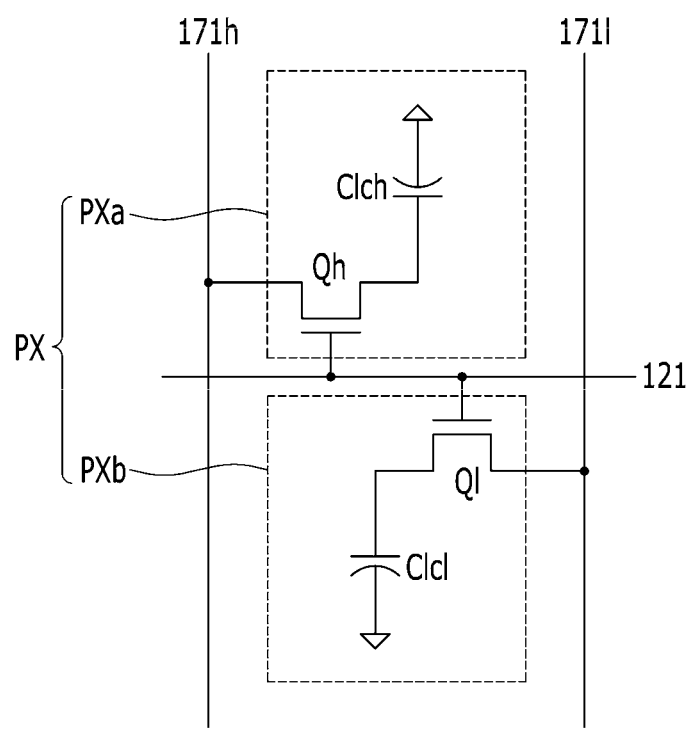
FIG. 2 shows an equivalent circuit diagram of a pixel of a display device according to an exemplary embodiment of the present disclosure.

FIG. 2 shows an equivalent circuit diagram of a pixel of a display device according to an exemplary embodiment of the present disclosure.

The display device includes a plurality of signal lines 121, 171$h$, and 171$l$, and a pixel PX connected thereto. Although not shown, a plurality of pixels PX may be disposed in a matrix format including a plurality of pixel rows and a plurality of pixel columns.

Each pixel PX may include a first sub-pixel PXa and a second sub-pixel PXb. The first sub-pixel PXa and the second sub-pixel PXb may be disposed from top to bottom, such as shown in FIG. 2. In this case, the first region V1 may be provided between the first sub-pixel PXa and the second sub-pixel PXb in the pixel row direction, and the second region V2 may be provided among a plurality of pixel columns.

The signal lines 121, 171$h$, and 171$l$ include a gate line 121 for transmitting a gate signal, and a first data line 171$h$ and a second data line 171$l$ for transmitting different data voltages.

A first thin film transistor (Qh) is connected to the gate line 121 and the first data line 171$h$, and a second thin film transistor (Ql) is connected to the gate line 121 and the second data line 171$l$.

A first liquid crystal capacitor Clch connected to the first thin film transistor (Qh) is formed on the first sub-pixel PXa, and a second liquid crystal capacitor Clcl connected to the second thin film transistor (Ql) is formed on the second sub-pixel PXb.

The first thin film transistor (Qh) includes a first terminal connected to the gate line 121, a second terminal connected to the first data line 171$h$, and a third terminal connected to the first liquid crystal capacitor Clch.

The second thin film transistor (Ql) includes a first terminal connected to the gate line 121, a second terminal connected to the second data line 171$l$, and a third terminal connected to the second liquid crystal capacitor Clcl.

Regarding the operation of a display device according to an exemplary embodiment of the present disclosure, when a gate-on voltage is applied to the gate line 121, the first thin film transistor (Qh) and the second thin film transistor (Ql) connected thereto are turned on, and the first and second liquid crystal capacitors Clch and Clcl are charged by different data voltages transmitted through the first and second data lines 171$h$ and 171$l$. The data voltage transmitted by the second data line 171$l$ is less than the data voltage transmitted by the first data line 171$h$. Therefore, the second liquid crystal capacitor Clcl is controlled to be charged with a lower voltage than the first liquid crystal capacitor Clch to improve lateral visibility.

The present disclosure, however, is not limited thereto, and a disposition design on the thin film transistors for applying different voltages to the two sub-pixels PXa and PXb are modifiable in various ways. The pixel PX may include a plurality of sub-pixels or may be configured with one pixel.

A configuration of one pixel of a display device according to an exemplary embodiment of the present disclosure is now described with reference to FIG. 3 to FIG. 5.

Figure 3:
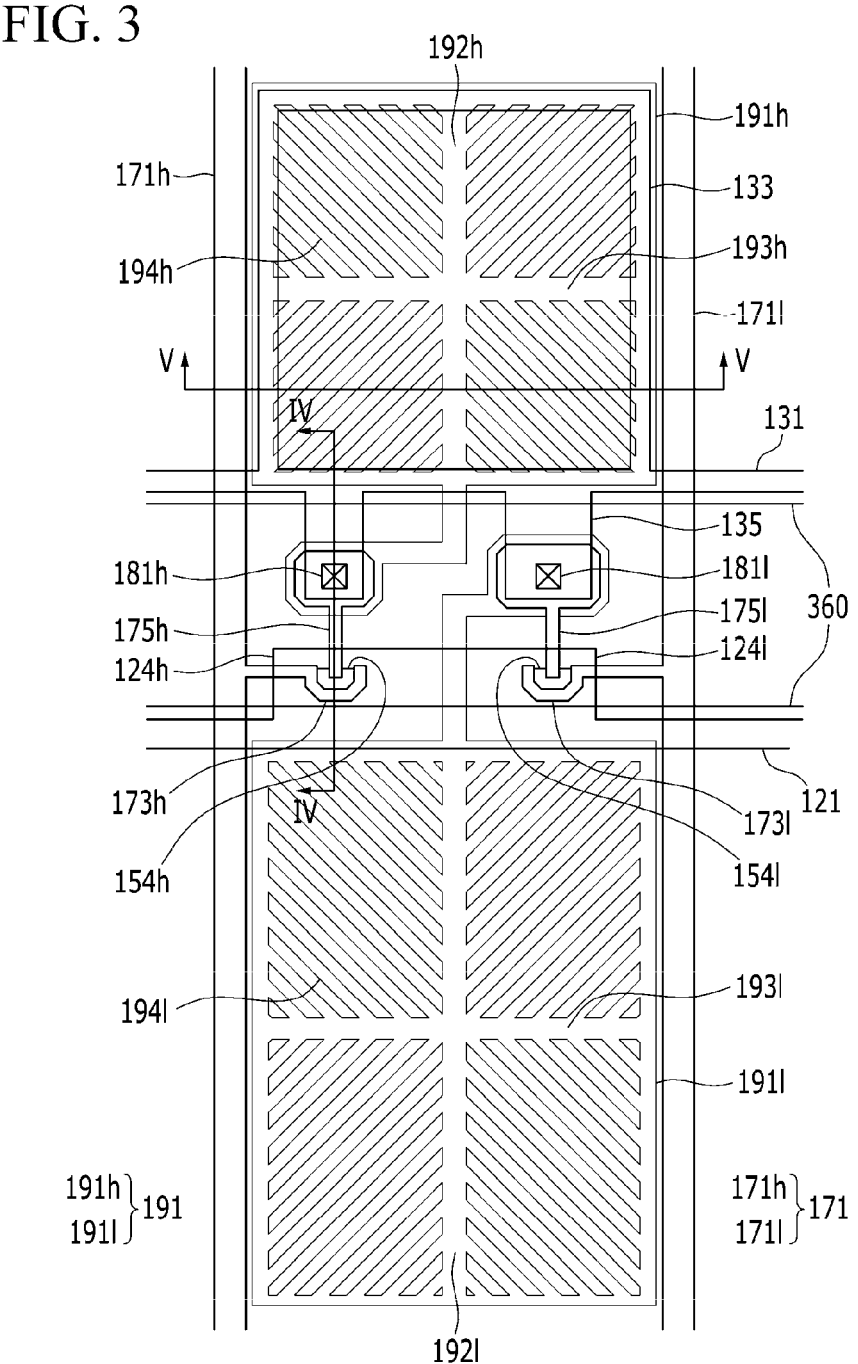
FIG. 3 shows a top plan view of part of a display device according to an exemplary embodiment of the present disclosure.

FIG. 3 shows a top plan view of part of a display device according to an exemplary embodiment of the present disclosure. FIG. 4 shows a cross-sectional view of a display device with respect to a line IV-IV according to an exemplary embodiment of the present disclosure. FIG. 5 shows a cross-sectional view of a display device with respect to a line V-V according to an exemplary embodiment of the present disclosure.

Figure 4:
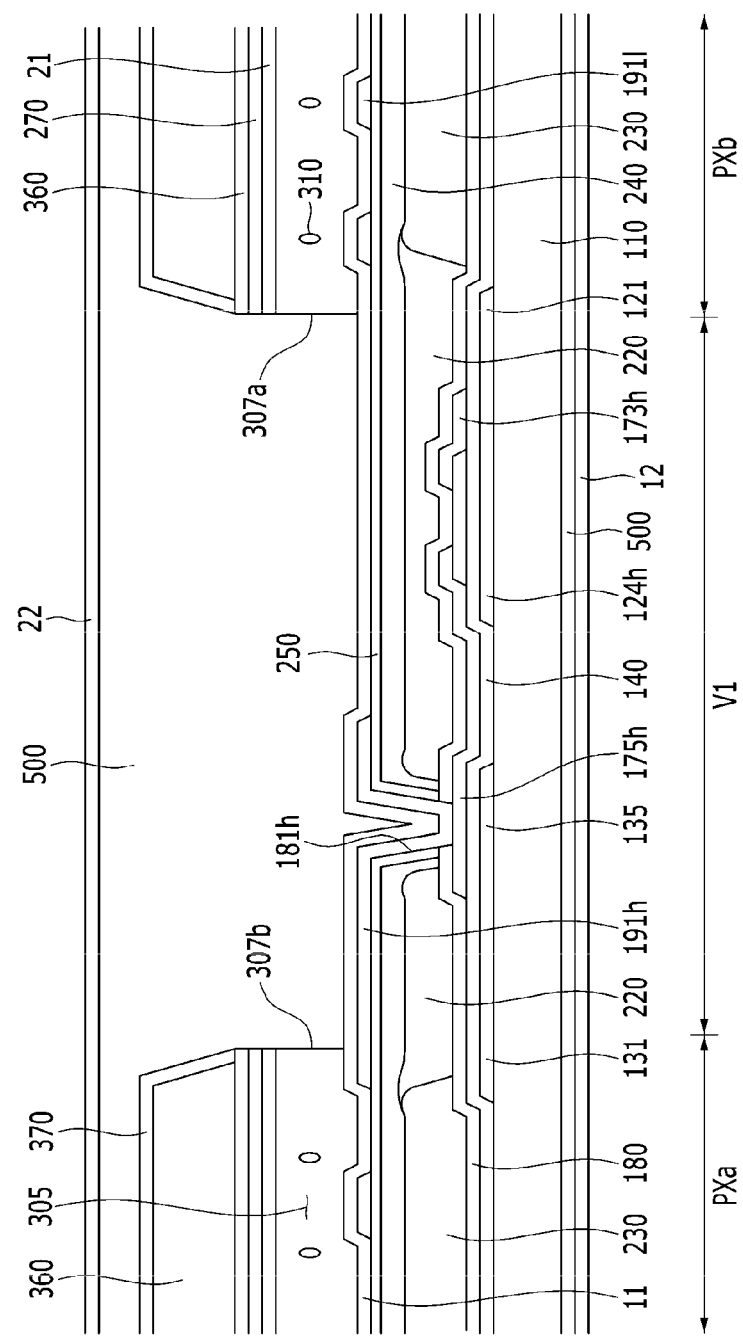
FIG. 4 shows a cross-sectional view of a display device with respect to a line IV-IV according to an exemplary embodiment of the present disclosure.
Figure 5:
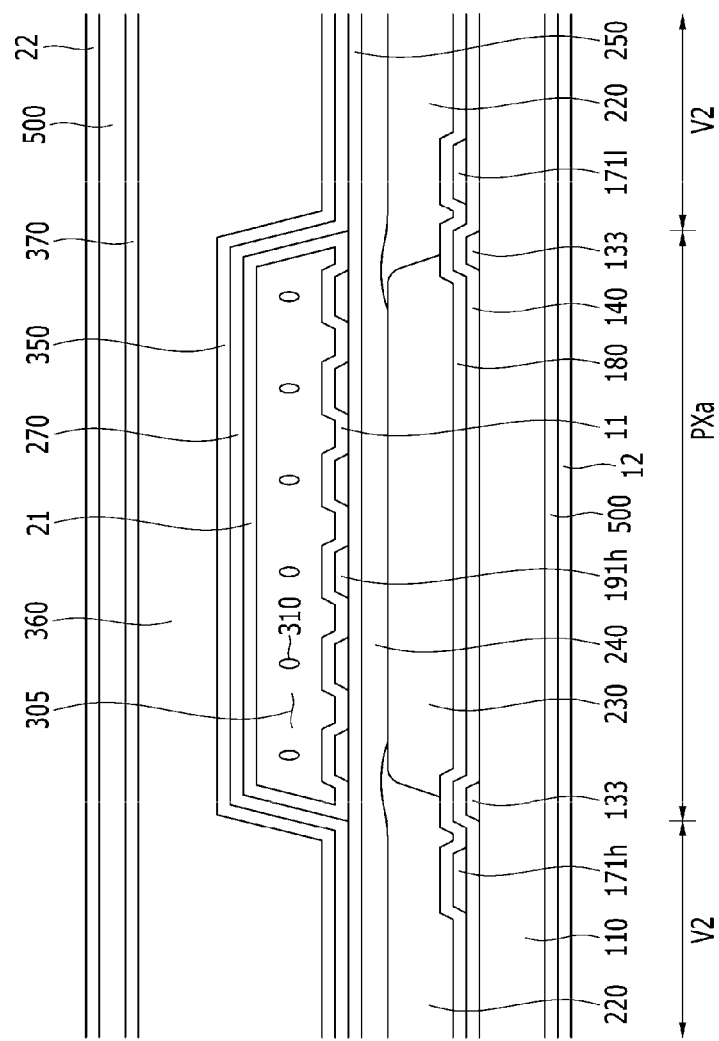
FIG. 5 shows a cross-sectional view of a display device with respect to a line V-V according to an exemplary embodiment of the present disclosure.

Referring to FIG. 3 to FIG. 5, a gate line 121 and a first gate electrode 124$h$ and a second gate electrode 124$l$ that protrude from the gate line 121 are formed on the substrate 110.

The gate line 121 extends in a first direction and transmits a gate signal. The gate line 121 is provided between two adjacent microcavities 305 provided in the column direction. That is, the gate line 121 is provided in the first region V1. The first gate electrode 124$h$ and the second gate electrode 124$l$ protrude to an upper side of the gate line 121 with respect to the floor plan view of FIG. 3. The first gate electrode 124$h$ may be connected to the second gate electrode 124$l$ to form a protrusion. The present disclosure is not limited thereto, and the first gate electrode 124$h$ and the second gate electrode 124$l$ may be modified to protrude in various ways.

A reference voltage line 131 and storage electrodes 133 and 135 protruding from the reference voltage line 131 may be further formed on the substrate 110.

The reference voltage line 131 extends parallel to the gate line 121 and is formed to be separate from the gate line 121. A predetermined voltage may be applied to the reference voltage line 131. The storage electrode 133 protruding over the reference voltage line 131 is formed to surround an edge of the first sub-pixel PXa. The storage electrode 135 protrudes below the reference voltage line 131 and is formed to be adjacent to the first gate electrode 124$h$ and the second gate electrode 124$l$. The storage electrode 135 protruding below the reference voltage line 131 overlaps a first drain electrode 175$h$ and a second drain electrode 175$l$, which are described below.

A gate insulating layer 140 is formed on the gate line 121, the first gate electrode 124$h$, the second gate electrode 124$l$, the reference voltage line 131, and the storage electrodes 133 and 135. The gate insulating layer 140 may be formed of an inorganic insulating material such as a silicon nitride (SiNx) or a silicon oxide (SiOx). In addition, the gate insulating layer 140 may be formed to be a single layer or multiple layers.

A first semiconductor 154$h$ and a second semiconductor 154$l$ are formed on the gate insulating layer 140. The first semiconductor 154$h$ may be provided on the first gate electrode 124$h$, and the second semiconductor 154$l$ may be provided on the second gate electrode 124$l$. The first semiconductor 154$h$ may be provided below the first data line 171$h$, and the second semiconductor 154$l$ may be provided below the second data line 171$l$. The first semiconductor 154$h$ and the second semiconductor 154$l$ may be formed of amorphous silicon, polycrystalline silicon, or a metal oxide.

An ohmic contact (not shown) may be further formed on the first semiconductor 154$h$ and the second semiconductor 154$l$. The ohmic contact may be made of a material such as a silicide or n+ hydrogenated amorphous silicon to which a highly concentrated n-type impurity is doped.

A first data line 171$h$, a second data line 171$l$, a first source electrode 173$h$, a first drain electrode 175$h$, a second source electrode 173$l$, and a second drain electrode 175$l$ are formed on the first semiconductor 154$h$, the second semiconductor 154$l$, and the gate insulating layer 140.

The first data line 171$h$ and the second data line 171$l$ transmit a data signal and extend in a second direction to cross the gate line 121 and the reference voltage line 131. The data line 171 is provided between the two adjacent microcavities 305 provided in the row direction. That is, the data line 171 is provided in the second region V2.

The first data line 171$h$ and the second data line 171$l$ transmit different data voltages. For example, the data voltage transmitted by the second data line 171$l$ may be lower than the data voltage transmitted by the first data line 171$h$.

The first source electrode 173$h$ is formed to protrude over the first gate electrode 124$h$ from the first data line 171$h$, and the second source electrode 173$l$ is formed to protrude over the second gate electrode 124$l$ from the second data line 171$l$. The first drain electrode 175$h$ and the second drain electrode 175$l$ respectively include a wide first end and a bar-type second end. The wide first ends of the first drain electrode 175$h$ and the second drain electrode 175$l$ overlap the storage electrode 135 protruding below the reference voltage line 131. The bar-type second ends of the first drain electrode 175$h$ and the second drain electrode 175$l$ are partly surrounded by the first source electrode 173$h$ and the second source electrode 173$l$. The first and second gate electrodes 124$h$ and 124$l$, the first and second source electrodes 173$h$ and 173$l$, and the first and second drain electrodes 175$h$ and 175$l$ form first and second thin film transistors (TFTs) Qh and Ql together with the first and second semiconductors 154$h$ and 154$l$, respectively. The thin film transistors include channels formed on the semiconductors 154$h$ and 154$l$ between the source electrodes 173$h$ and 173$l$ and the drain electrodes 175$h$ and 175$l$.

A passivation layer 180 is formed on the first semiconductor 154$h$ exposed between the first source electrode 173$h$ and the first drain electrode 175$h$, on the first source electrode 173$h$, on the first drain electrode 175$h$, on the second semiconductor 154$l$ exposed between the second source electrode 173$l$ and the second drain electrode 175$l$, on the second source electrode 173$l$, on the second drain electrode 175$l$, on the first data line 171$h$, and the second data line 171$l$. The passivation layer 180 may be formed of an organic insulating material or an inorganic insulating material, and may be formed to be a single layer or multiple layers.

A color filter 230 is formed in the pixel PX on the passivation layer 180.

The color filter 230 may express one of three primary colors, such as red, green, and blue. The color filter 230 may also express cyan, magenta, yellow, or a white based color and not be limited to the three primary colors. The color filter 230 is not formed in the first region V1 and/or the second region V2.

A light blocking member 220 is formed in a region between neighboring color filters 230. The light blocking member 220 may be formed on a border of the pixel PX and the thin film transistors Qh and Ql to prevent light leakage. That is, the light blocking member 220 may be formed in the first region V1 and the second region V2. The color filter 230 may overlap the light blocking member 220 in part of a region.

A first insulating layer 240 may be further formed on the color filter 230 and the light blocking member 220. The first insulating layer 240 may be formed of an organic insulating material and create a flat surface on upper sides of the color filter 230 and the light blocking member 220.

A second insulating layer 250 may be further formed on the first insulating layer 240. The second insulating layer 250 may be formed of an inorganic insulating material.

A first contact hole 181h for exposing a wide end portion of the first drain electrode 175h and a second contact hole 181l for exposing a wide end portion of the second drain electrode 175l are formed on the passivation layer 180, the first insulating layer 240, and the second insulating layer 250.

A pixel electrode 191 is formed on the second insulating layer 250. The pixel electrode 191 may be made of a transparent metal oxide such as an indium tin oxide (ITO) or an indium zinc oxide (IZO).

The pixel electrode 191 may include a first sub-pixel electrode 191h and a second sub-pixel electrode 191l, which are separated from each other with the gate line 121 and the reference voltage line 131 therebetween. The first sub-pixel electrode 191h and the second sub-pixel electrode 191l are disposed from top to bottom with respect to the gate line 121 and the reference voltage line 131 on the floor plan view of FIG. 3. That is, the first sub-pixel electrode 191h is separated from the second sub-pixel electrode 191l with the first region V1 therebetwen, the first sub-pixel electrode 191h is provided on the first sub-pixel PXa, and the second sub-pixel electrode 191l is provided on the second sub-pixel PXb.

The first sub-pixel electrode 191h is connected to the first drain electrode 175h through the first contact hole 181h, and the second sub-pixel electrode 191l is connected to the second drain electrode 175l through the second contact hole 181l. Therefore, when the first thin film transistor (Qh) and the second thin film transistor (Ql) are turned on, the first sub-pixel electrode 191h and the second sub-pixel electrode 191l receive different data voltages from the first drain electrode 175h and second drain electrode 175l.

The first sub-pixel electrode 191h and the second sub-pixel electrode 191l are quadrangular, and the first sub-pixel electrode 191h and the second sub-pixel electrode 191l include cross-shaped stems, including horizontal stems 193h and 193l, and vertical stems 192h and 192l crossing the horizontal stems 193h and 193l. The first sub-pixel electrode 191h and the second sub-pixel electrode 191l respectively include a plurality of fine branches 194h and 194l.

Each of the sub-pixel electrodes 191h and 191l is divided into four sub-regions by the horizontal stems 193h and 193l and the vertical stems 192h and 192l. The fine branches 194h and 194l obliquely extend from the horizontal stems 193h and 193l and the vertical stems 192h and 192l, and the extending direction may form an angle of substantially 45 or 135 degrees with respect to the gate line 121 or the horizontal stems 193h and 193l. The fine branches 194h and 194l of two neighboring sub-regions may extend to be perpendicular to each other.

In the present exemplary embodiment, the first sub-pixel electrode 191h and the second sub-pixel electrode 191l may further include an external stem for surrounding external sides of the first sub-pixel PXa and the second sub-pixel PXb.

The above-described disposition and form of the pixel, the configuration of the thin film transistor, and the form of the pixel electrode are exemplary. Thus the present disclosure is not limited thereto, and various modifications are possible.

A common electrode 270 is formed on the pixel electrode 191 so that it may be separated from the pixel electrode 191 by a predetermined distance. A microcavity 305 is formed between the pixel electrode 191 and the common electrode 270

That is, the microcavity 305 is sandwiched by the pixel electrode 191 and the common electrode 270. The common electrode 270 extends in the row direction and is formed over the microcavity 305 and in the second region V2. The common electrode 270 is formed to cover part of an upper side and a lateral side of the microcavity 305. The size of the microcavity 305 may vary in many ways according to the size and resolution of the display device.

The present disclosure is not limited thereto, and an insulation layer may be formed between the common electrode 270 and the pixel electrode 191.

The microcavity 305 may be formed on the common electrode 270.

The common electrode 270 may be made of a transparent metal oxide such as an indium tin oxide (ITO) or an indium zinc oxide (IZO). A predetermined voltage may be applied to the common electrode 270 so that an electric field may be formed between the pixel electrode 191 and the common electrode 270.

Alignment layers 11 and 21 are formed above the pixel electrode 191 and below the common electrode 270

The alignment layers 11 and 21 include a first alignment layer 11 and a second alignment layer 21. The first alignment layer 11 and the second alignment layer 21 may be formed with vertical alignment layers, and may be made of an alignment material such as polyamic acid, polysiloxane, or polyimide. The first and second alignment layers 11 and 21 may be connected on a side wall at an edge of the microcavity 305.

The first alignment layer 11 is formed on the pixel electrode 191. The first alignment layer 11 may be formed directly on the second insulating layer 250 not covered by the pixel electrode 191. The first alignment layer 11 may also be formed in the first region V1.

The second alignment layer 21 is formed below the common electrode 270 so that it may face the first alignment layer 11.

A liquid crystal layer formed with liquid crystal molecules 310 is formed in the microcavity 305 provided between the pixel electrode 191 and the common electrode 270. The liquid crystal molecules 310 may have negative dielectric anisotropy and may stand vertically with respect to the substrate 110 when the electric field is not applied. That is, a vertical alignment may be performed.

The first sub-pixel electrode 191h and the second sub-pixel electrode 191l to which the data voltage is applied generate the electric field with the common electrode 270 to determine a direction of the liquid crystal molecules 310 provided in the microcavity 305 between the electrodes 191 and 270. Luminance of light passing through the liquid crystal layer is changed by the determined direction of the liquid crystal molecules 310.

A third insulating layer 350 may be formed on the common electrode 270. The third insulating layer 350 may be formed with an inorganic insulating material such as silicon nitride (SiNx) or silicon oxide (SiOx) and may be omitted in certain cases.

A roof layer 360 is formed on the third insulating layer 350. The roof layer 360 may be made of an organic material. The roof layer 360 is formed to extend in a row direction, and is formed over the microcavity 305 and in the second region V2. The roof layer 360 is formed to cover part of the upper side and the lateral side of the microcavity 305. The roof layer 360 is made hard, such as by a curing process, to maintain the form of the microcavity 305. The roof layer 360 is formed to be separate from the pixel electrode 191 with the microcavity 305 therebetween.

The common electrode 270 and the roof layer 360 are formed to not cover part of the lateral side at the edge of the microcavity 305. The portions of the microcavity 305 that are not covered by the common electrode 270 and the roof layer 360 are referred to as injection holes 307a and 307b. The injection holes 307a and 307b consist of a first injection hole 307a for exposing a lateral side at the first edge of the microcavity 305 and a second injection hole 307b for exposing a lateral side at the second edge of the microcavity 305. The first edge faces the second edge. For example, the first edge may be an upper edge of the microcavity 305 and the second edge may be a lower edge of the microcavity 305, as shown by the floor plan view o. FIG. 1. The microcavity 305 is exposed by the injection holes 307a and 307b in the process of manufacturing a display device so that an aligning agent and/or a liquid crystal material may be injected into the microcavity 305 through the injection holes 307a and 307b.

A fourth insulating layer 370 may be further formed on the roof layer 360. The fourth insulating layer 370 may be made of an inorganic insulating material such as a silicon nitride (SiNx) or a silicon oxide (SiOx). The fourth insulating layer 370 may be formed to cover the upper side and/or the lateral side of the roof layer 360. The fourth insulating layer 370 protects the roof layer 360 made of an organic material and may be omitted in certain cases.

An adhesive member 500 is formed on the fourth insulating layer 370. The adhesive member 500 is formed to cover the injection holes 307a and 307b that expose part of the microcavity 305. That is, the adhesive member 500 may seal the microcavity 305 so that the liquid crystal molecules 310 formed inside the microcavity 305 cannot escape.

The adhesive member 500 is provided directly on the fourth insulating layer 370. The fourth insulating layer 370 may be omitted in certain cases, and in those cases, the adhesive member 500 is provided directly on the roof layer 360.

The adhesive member 500 may be made of a pressure-sensitive adhesive (PSA) or a photo-curing adhesive.

The pressure-sensitive adhesive includes, for example, an adhesive in which an adhesive action occurs when a pressure for adhering the adhesive to an adhering surface is applied. No solvent, water, or heat is needed to activate the adhesive. The strength of the pressure-sensitive adhesive is influenced by the amount of pressure with which the adhesive is applied to the surface. The pressure-sensitive adhesive is manufactured to maintain appropriate adherence and sustainability at room temperature. However, adherence may be lost or reduced at a low temperature, and a pre-stage resistance may be reduced at a high temperature. There are adhesives that operate normally at low or high temperatures.

The photo-curing adhesive includes, for example, an adhesive that maintains liquidity when it is not exposed to light and begins a curing reaction when light is irradiated thereto. The photo-curing adhesive may be an ultraviolet ray curing adhesive or a visible light curing adhesive according to a wavelength of the exposed light. The ultraviolet ray curing adhesive begins the curing reaction when ultraviolet rays are irradiated, and the visible light curing adhesive begins the curing reaction when visible light is irradiated. The photo-curing adhesive excels in interface adherence and vapor transmission resistance. Therefore, adherence to the roof layer 360 or the fourth insulating layer 370 may be improved, and no inflow of moisture into the microcavity 305 may be possible.

Because the adhesive member 500 contacts the liquid crystal molecule 310, it the adhesive member 500 may be formed with a material that does not react to the liquid crystal molecules 310. The pressure-sensitive adhesive and the photo-curing adhesive, for example, are gel-type and high-viscosity materials that do not generate a reaction when contacting the liquid crystal molecules 310.

A first polarizer 22 is provided on the adhesive member 500. The first polarizer 22 is fixed to the roof layer 360 by the adhesive member 500.

A second polarizer 12 may be further provided below the substrate 110. The adhesive member 500 may also be provided between the substrate 110 and the second polarizer 12. The second polarizer 12 is fixed below the substrate 110 by the adhesive member 500.

A display device according to an exemplary embodiment of the present disclosure is now described with reference to FIG. 6 to FIG. 9.

Many parts of the display device shown in FIG. 6 to FIG. 9 correspond to the display device shown in FIG. 1 to FIG. 5, and thus such parts are not described again here. The adhesive member is made of two materials in the present exemplary embodiment, however, which is different from the previous exemplary embodiment, and thus is now described.

Figure 6:
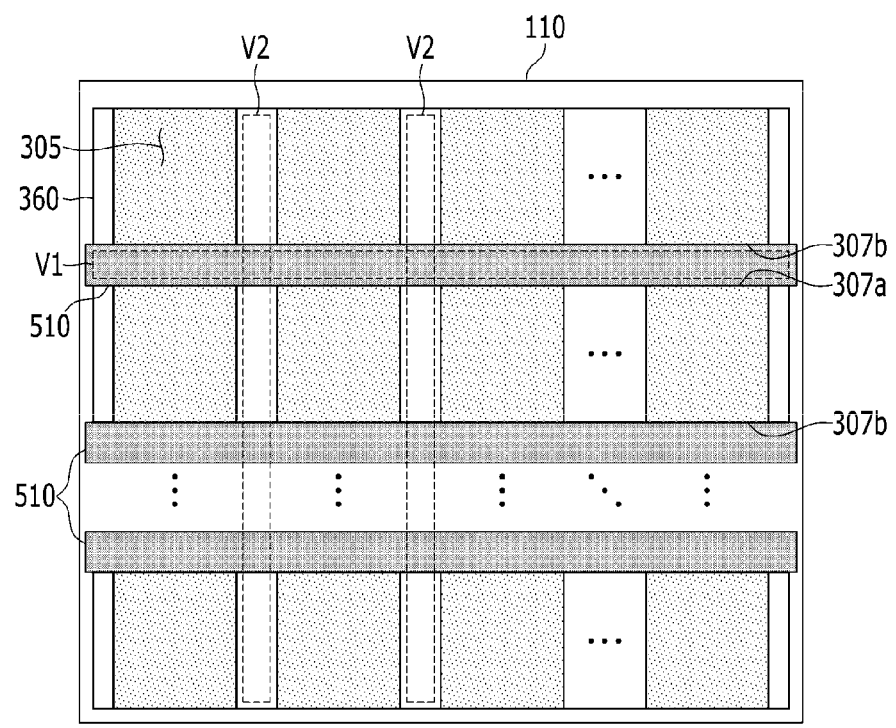
FIG. 6 shows a top plan view of a display device according to an exemplary embodiment of the present disclosure.
Figure 7:
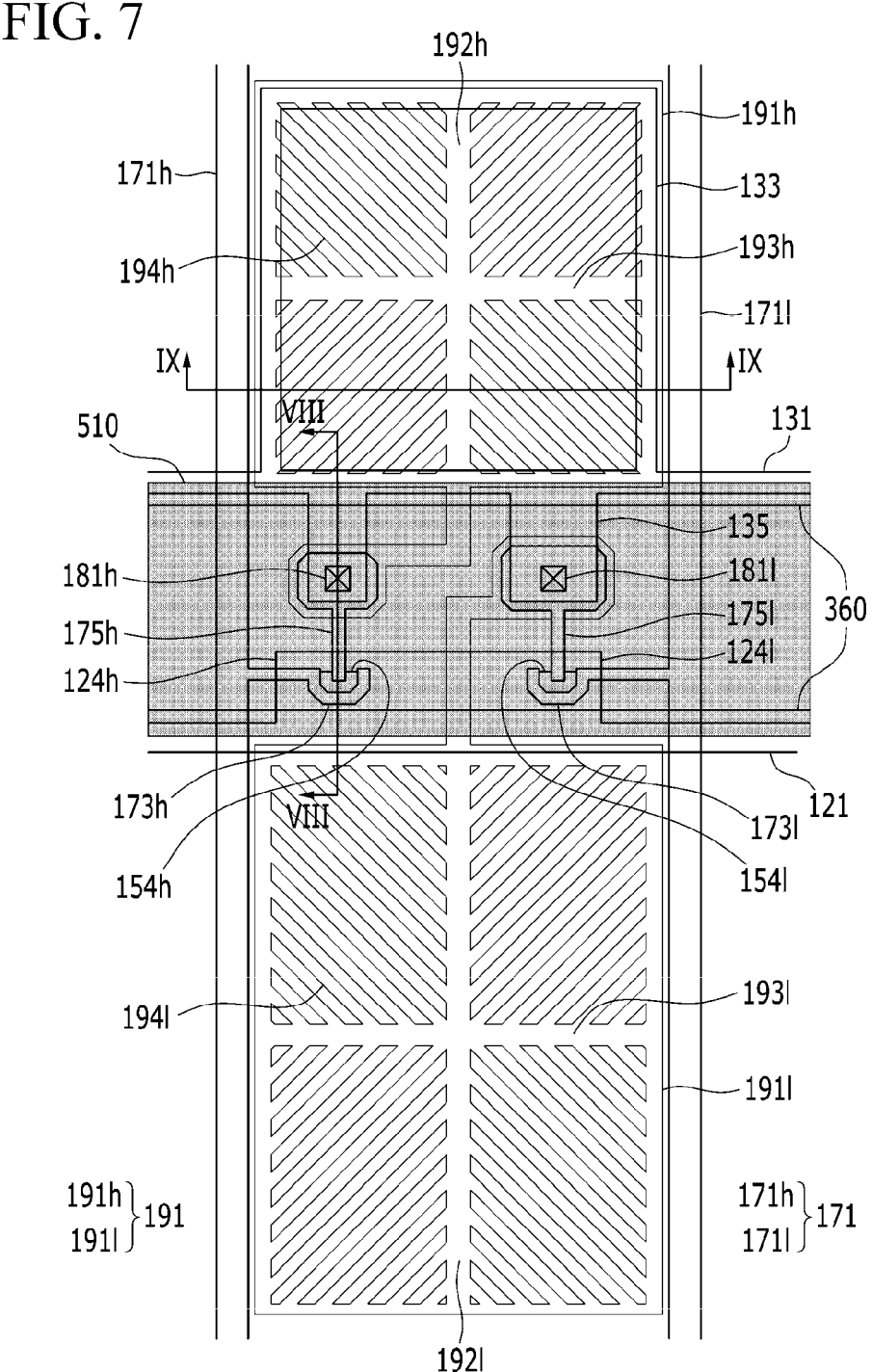
FIG. 7 shows a top plan view of part of a display device according to an exemplary embodiment of the present disclosure.
Figure 8:
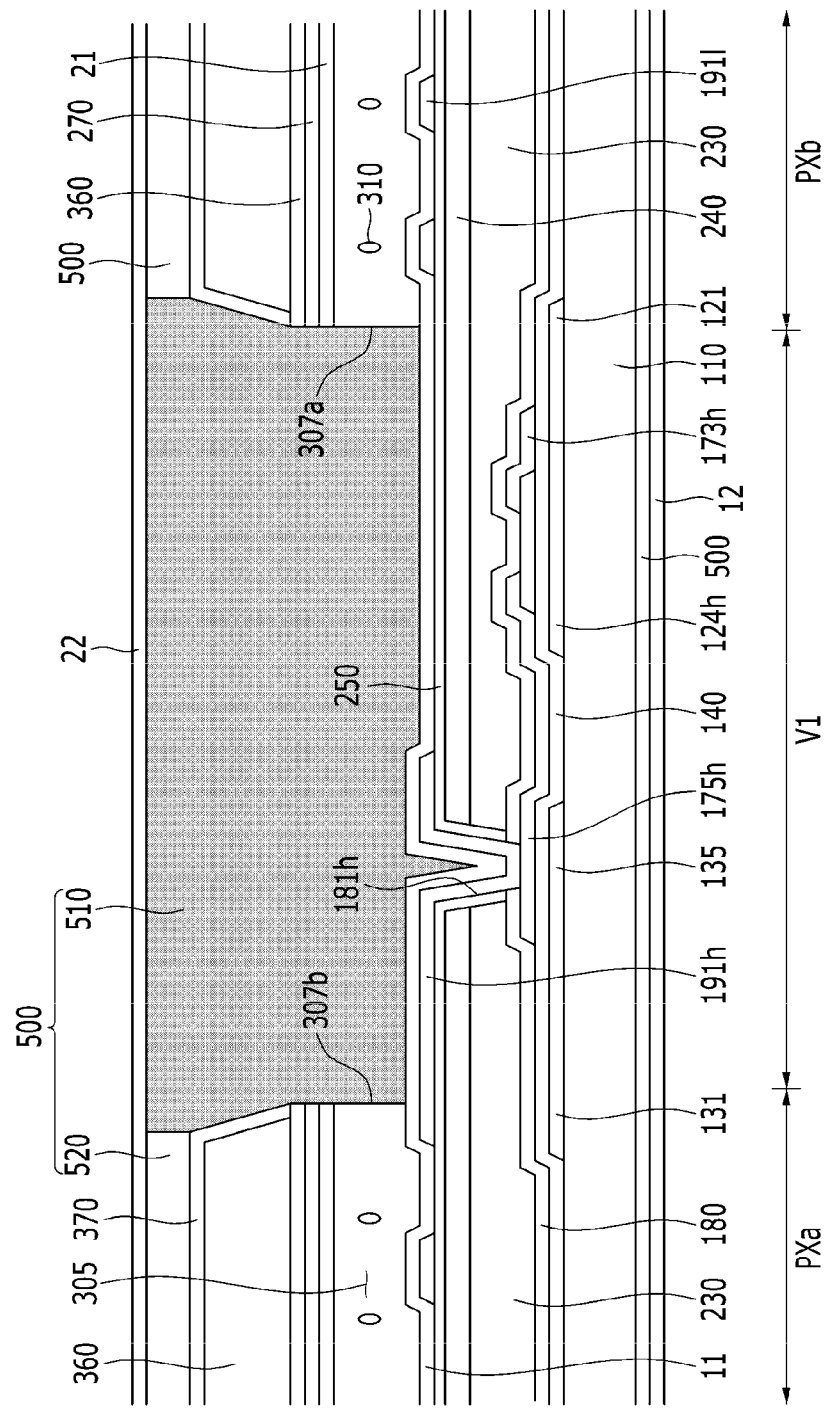
FIG. 8 shows a cross-sectional view of a display device with respect to a line VIII-VIII of FIG. 7 according to an exemplary embodiment of the present disclosure.
Figure 9:
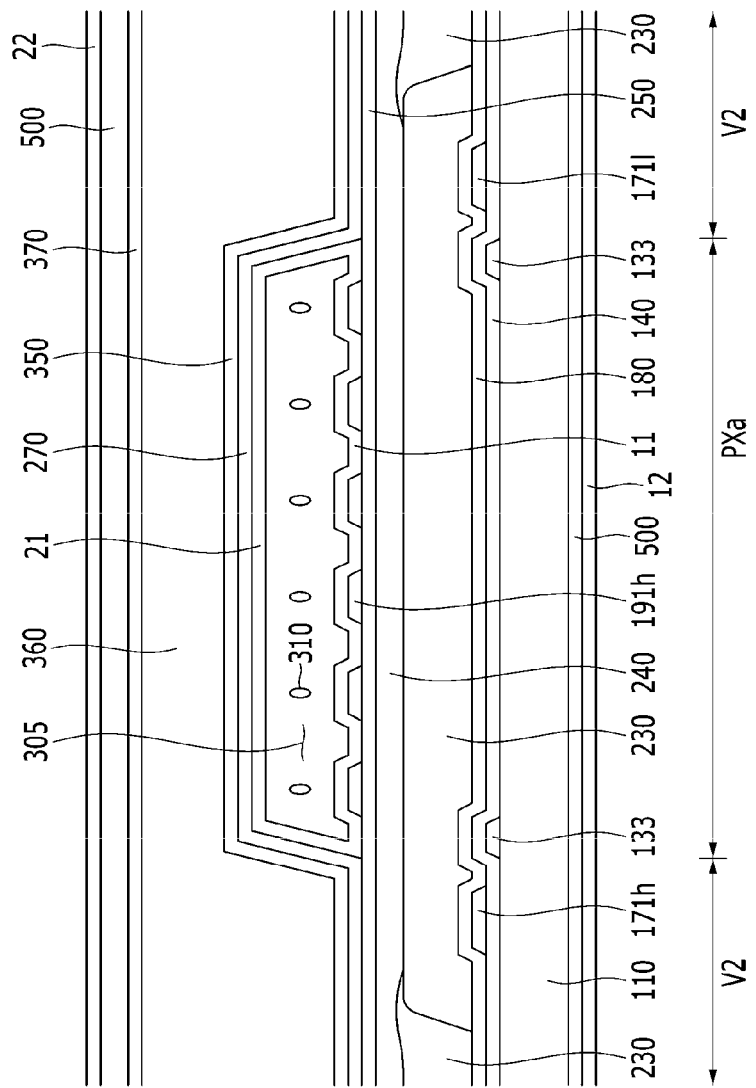
FIG. 9 shows a cross-sectional view of a display device with respect to a line IX-IX of FIG. 7 according to an exemplary embodiment of the present disclosure.

FIG. 6 shows a top plan view of a display device according to an exemplary embodiment of the present disclosure. FIG. 7 shows a top plan view of part of a display device according to an exemplary embodiment of the present disclosure. FIG. 8 shows a cross-sectional view of a display device with respect to a line VIII-VIII of FIG. 7 according to an exemplary embodiment of the present disclosure. FIG. 9 shows a cross-sectional view of a display device with respect to a line IX-IX of FIG. 7 according to an exemplary embodiment of the present disclosure.

In the present exemplary embodiment, the adhesive member 500 includes a first adhesive member 510 and a second adhesive member 520. The first adhesive member 510 is provided in the first region V1, and the second adhesive member 520 is provided in a region other than the first region V1. Therefore, the first adhesive member 510 is provided on the first alignment layer 11 and the second insulating layer 250 in the first region V1. The second adhesive member 520 is provided on the roof layer 360 and the fourth insulating layer 370.

The first adhesive member 510 is made of a light blocking material. The first adhesive member 510 is formed on the thin film transistor provided in the first region V1 to prevent light leakage. Hence, the light leakage may be prevented without forming an additional light blocking member in the first region V1, and thus the process may be simplified, and the cost may be reduced.

The light leakage may be prevented in the second region V2 by allowing a plurality of color filters in a neighboring pixel area PX to overlap each other. Hence, the light leakage may be prevented without forming an additional light blocking member in the second region V2, and thus the process may be simplified, and the cost may be reduced.

The second adhesive member 520 is made of a transparent material. The second adhesive member 520 overlaps the liquid crystal layer, and the light that passes through the liquid crystal layer also passes through the second adhesive member 520 and then the first polarizer 22 and displays a screen image.

It has been described that the first adhesive member 510 for blocking light is provided in the first region V1, and a second adhesive member 520 with transparency is provided in another region, but the present disclosure is not limited thereto. The first adhesive member 510 with transparency may be provided in the first region V1 and the second region V2. In this case, the second adhesive member 520 is provided in a region other than the first region V1 and the second region V2.

While the present system and method have been described in connection with exemplary embodiments, it is to be understood that the present system and method are not limited to the disclosed embodiments. On the contrary, the present system and method cover various modifications and equivalent arrangements included within the spirit and scope of the appended claims.

What is claimed is:

1. A display device comprising:
a substrate;
a thin film transistor provided on the substrate;
a pixel electrode connected to the thin film transistor;
a roof layer disposed on the pixel electrode to be spaced apart from the pixel electrode with a plurality of microcavities therebetween;
a liquid crystal layer for filling the microcavities;
an adhesive member formed on the roof layer and sealing the microcavities; and
a first polarizer provided on the adhesive member.

2. The display device of claim 1, wherein
the adhesive member is provided directly on the roof layer.

3. The display device of claim 1, further comprising
an insulating layer provided on the roof layer,
wherein the roof layer is made of an organic material, and the insulating layer is made of an inorganic insulating material.

4. The display device of claim 3, wherein
the adhesive member is provided directly on the insulating layer.

5. The display device of claim 1, wherein
the adhesive member is made of a pressure-sensitive adhesive (PSA) or a photo-curing adhesive.

6. The display device of claim 1, wherein
the display device includes a plurality of roof layers, and the plurality of roof layers extend in a first direction, and a first region is provided among the roof layers.

7. The display device of claim 6, wherein
the adhesive member includes
a first adhesive member provided in the first region and formed of a material that blocks light; and
a second adhesive member provided on the roof layer and formed of a material that transmits light.

8. The display device of claim 7, wherein
the thin film transistor is provided in the first region, and the first adhesive member is provided on the thin film transistor.

9. The display device of claim 7, wherein
a second region is provided among the adjacent microcavities in the first direction.

10. The display device of claim 9, further comprising
a plurality of color filters provided below the pixel electrode,
wherein the color filters overlap each other in the second region.

11. The display device of claim 1, further comprising
a second polarizer provided below the substrate,
wherein the adhesive member is further provided between the substrate and the second polarizer.

* * * * *